HIGH RECORDING DENSITY MAGNETIC MEDIA WITH SQUARE B-H LOOP

Filed June 3, 1971 3 Sheets-Sheet 1

INVENTORS
PRAVIN K. PATEL
ELIOT STONE

BY Louis A Kline
Joseph Dwyer
THEIR ATTORNEYS

HIGH RECORDING DENSITY MAGNETIC MEDIA WITH SQUARE B-H LOOP

INVENTORS
PRAVIN K. PATEL
ELIOT STONE

BY Louis A. Kline
Joseph A. Dwyer

THEIR ATTORNEYS

HIGH RECORDING DENSITY MAGNETIC MEDIA WITH SQUARE B-H LOOP

Filed June 3, 1971 3 Sheets-Sheet 3

INVENTORS
PRAVIN K. PATEL
ELIOT STONE

Louis A Kline

BY Joseph R Dwyer

THEIR ATTORNEYS

1

3,738,818
HIGH RECORDING DENSITY MAGNETIC MEDIA WITH SQUARE B-H LOOP

Eliot Stone and Pravin K. Patel, Los Angeles, Calif., assignors to Control Data Corporation, Minneapolis, Minn.

Filed June 3, 1971, Ser. No. 149,717
Int. Cl. B32b *15/00*
U.S. Cl. 29—194 10 Claims

ABSTRACT OF THE DISCLOSURE

A magnetic recording medium and a method of producing it which permits the production of a magnetic recording medium having a high intrinsic coercivity greater than 300 oersteds and an 0.95 square B-H hysteresis loop permitting high switching speeds and high density recording. The magnetic recording medium comprises an aluminum alloy disc substrate covered by zinc and nickel layers, overlaid by a gold film and thin-film cobalt magnetic layer. The fabrication process involves electroless deposition of thin-film layers of zinc and nickel on the substrate, then the deposition of a one-half micro-inch gold layer covered by a cobalt phosphorus thin-film layer. The method provides for tailoring of the value of coercivity independent of the thickness of the magnetic film layer.

BACKGROUND

The present invention is directed to magnetic record members suitable for recording magnetic information, and for readout and utilization of such information by means of readout devices such as magnetic heads. The magnetic record members involved may be those such as drum, disc, or other forms which support a thin-film layer of magnetic recording medium.

The present invention, in its most preferred embodiment, will be described in terms of magnetic recording media in the form of magnetic record discs suitable for use with readout mechanisms such as "flying" magnetic heads which fly adjacently close to the magnetic record member for purposes of either writing upon or reading out signals from said magnetic record media.

Typical of the normally used recording systems are those providing for spacing between the magnetic record surfaces and the magnetic heads during recording or reproducing operations. Such mechanisms include either fixed heads or "flying" heads. The "flying" heads provide an assembly for supporting a head or heads closely spaced above the magnetic recording surface during relative movement thereof to the desired depth within a layer of air carried by and moving along with the record surface on a laminar flow. These flying heads have a contoured or flat surface opposite the moving magnetic record surface, the flying heads being supported during operation within the film of air. The peripheral edge of this head surface or other head structure is not intended to make contact with the magnetic record surface so that it is essential that the magnetic fields, converted into flux

2 reversals which are present on the magnetic recording surface, be sufficiently powerful to impinge a clear output signal on the magnetic flying head when it is desired to take information from the magnetic recording surface for conversion into usable signals.

One of the characteristics of magnetic recording surfaces in these type operations is the capability of storing a large magnitude of magnetic information in a small linear track area of the magnetic recording medium. The more quantity of magnetic information, or bits per inch, that can be realiably stored for distinctive output, the better the quality, economy and usefulness of the magnetic recording medium.

There are at least two critical characteristics required in a quality magnetic recording medium which highlight important aspects of the present invention. One of these characteristics is "coercivity," which is related to the ability of the magnetic medium to remain uninfluenced until the applied magnetic flux is sufficiently strong to cause the magnetic medium to be permanently magnetized at a given spot, such as is required when a unit bit of information is impressed upon the magnetic medium. Thus, when the magnetic medium has a very low coercivity, it is understandable that any stray or spurious fields will easily impinge themselves upon the magnetic recording medium and thus destroy or make incorrect the desired information recorded thereon. On the other hand, if the magnetic recording medium has very high coercivity, then any information signals which are impressed thereupon will reliably maintain their character without degradation from stray or spurious magnetic fields (which are generally of a low order magnitude) which may try to impose themselves. Thus, in general, it might be said that the higher the coercivity, the better the integrity of the information recorded in the magnetic medium. However, this is subject to the limits of what magnetic field power is capable of being developed by the flying head when recording is taking place, so there is a limitation, this being the optimum amount of input signal which will reliably impinge its information upon the magnetic medium in the face of the coercivity factor of the magnetic medium.

Another of these critical characteristics is the strength of the field flux attributable to any basic unit of information already impinged upon the magnetic recording medium. Since the magnetic pickup or flying head is spaced by a barrier layer of air from the magnetic recording medium, then if the flux field attributable to a unit bit of magnetic informtion is very low, the picked-up output signal gathered by the magnetic flying head will be very low, subject to noise and interference, and present a difficult condition for distinguishing between a unit of information and a unit of noise. On the other hand, if the strength of the flux attributable to a given unit of information on the magnetic recording medium is relatively high, then it will be easy for the flying head to pick up and distinguish an informtion signal suitable for use and conversion into useful information. In this respect, it might be said that the important factor involved here is that designated as "remanence"—which is the flux density remaining in a material after a field strength, sufficient to produce the magnetically saturated condition, has fallen to zero or been taken away. Thus the "remanence" factor of the magnetic recording medium is of considerable importance as a measure of the amount of output signal which a unit of magnetic information can provide to a pick-up head.

It is, therefore, an object of the present invention to provide an improved magnetic record member suitable for use in a recording/reproducing system of the "flying" head type which will provide a more uniform and more reliable output signal to the flying head than magnetic members heretofore known. The electrical and magnetic characteristics of such magnetic recording members vary in accordance with many parameters. Thus, difficulty is often involved to consistently produce successive groups or "batches" of magnetic recording media having substantially the same characteristics. Uniformity of characteristics in magnetic devices is extremely desirable, so that the electrical apparatus employed in conjunction therewith, in an information-processing system, may be constructed with greater latitude, wider tolerances and greater reliability in its capability of producing satisfactory results in operation of the system.

Thus, in order to overcome the limitations of prior magnetic recording media, the present invention provides for a base substrate having thin-film deposited layers of zinc and nickel; overlaying the nickel is a thin-film deposition of gold over which is deposited a cobalt (Co-P) magnetic recording layer. This configuration has been found to provide a most unusual set of characteristics quite different from the ordinary magnetic recording medium having a substrate layered merely with zinc-nickel and a cobalt magnetic recording layer.

The term "thin-film" is used herein according to its common technical meaning, i.e., to designate a film having a thickness of 10,000 angstrom units or less and retaining "single magnetic domain" characteristics. Preferably the cobalt magnetic thin-film, as used herein, is at least 2-microinches but less than 24 microinches thick.

In the desired system arrangement, the record heads or other "flying" structural members of a multiple head assembly are maintained within 100 microinches of the record surface which is well within the layer of air moving with the record surface. In practice, it is deemed desirable that the binary digits or magnetically recorded information be sufficiently strong to give an output signal which can be picked up by the flying magnetic head such that the strength of the picked up signal is sufficiently good to differentiate it from noise and other spurious signals which may be picked up. Further, it is especially desirable that the magnetic record medium be able to store as much information, say in bits per inch, as is feasibly possible while still giving a sufficiently strong and reliable output signal. In addition, the magnetic recording medium should be such that one unit or bit of information is easily differentiatable from adjacent bits of information so that there is no spilling or lapping over of magnetic flux having sufficient strength to influence its adjacent bit of information. Thus, in general, the higher the coercivity of the magnetic recording medium, the less likelihood that adjacent bits or other spurious magnetic signals will influence any other given bit of magnetically recorded data.

Thus, one object of the present invention is the provision of a magnetic recording medium having high intrinsic coercivity which permits a uniformly strong output signal to a magnetic pick-up over the range of recording frequencies (or recording densities); and also provides for a square loop characteristic of its magnetic layer of at least 0.95 vertical slope.

Another object is to provide for the production of a magnetic recording disc capable of being tailored to coercivities in the range of 300 to 500 orsteds and having a square loop hysteresis characteristic of the order of at least 0.95 vertical slope.

Another object of the invention is to provide a process using chemical deposition methods only (electroless) such that a magnetic record member can be produced economically and uniformly with a design quality that is reproducible and predictable in characteristic.

In summary, the magnetic record member consists of an aluminum alloy disc substrate having a zinc layer and nickel layer over which is deposited a thin-film of gold upon which a thin-film magnetic layer of cobalt is placed.

The method of production, briefly, involves the use of a catalytically active substrate suitable for receiving a metallic deposit by chemical reduction; a chemical deposition of a gold film which is also activated; the immersion of said combination in a complexed aqueous solution having constituent cobalt ions and hypophosphite ions; and maintaining of the substrate in solution for a time sufficient to effect deposition by chemical reduction of a cobalt deposit thereon.

The area involved in this invention must be distinguished from media where only small coercivities of the range of 2 to 20 oersteds are involved, and where an "electrical" deposition method is used rather than chemical deposition. This invention contemplates magnetic media having coercivities of 200 oersteds and higher.

As is well known to those skilled in the art of chemical deposition, chemical reduction of metallic ions is essentially a controlled autocatalytic reduction process of the depositing species on an active metal such as aluminum, iron, nickel, cobalt, palladium, zinc, and the like, in the presence of hypophosphite ions; and where non-active metals such as copper and alloys thereof are normally activated by immersion deposition of palladium onto the depositing surface thereof.

With regard to further information on specific compositions for immersion baths used in plating solutions for deposition of cobalt, reference may be had to U.S. Pat. No. 3,219,471 which is assigned to the same assignee as that of the present invention.

The magnetic recording medium of the present invention should also be differentiated from arts which use the "magnetic oxide type" recording medium and the problems of magnetic oxides.

The concept of this invention should further be distinguished from other areas of magnetic recording media such as, for example, "soft" media as Permalloy, where the intrinsic coercivities, $H_{ci}$, are under 50 oersteds. These types of materials already have a square B-H hysteresis loop characteristic so little or no problem is involved in achieving square loops.

The instant invention involves thin-films less than 150 microinches capable of much higher coercivities and consequently involves the problem-area where squareness of B-H characteristics is an important factor.

Thus, the scope of the present invention will be seen to involve relatively thin-film layers of depositions in which all the deposited layers are 150 microinches or less in thickness.

Further, the instant invention involves magnetic media having selectively higher intrinsic coercivities, all of which are greater than 200 oersteds and which may sometimes go as high as 800 oersteds.

Description

Figure 1:
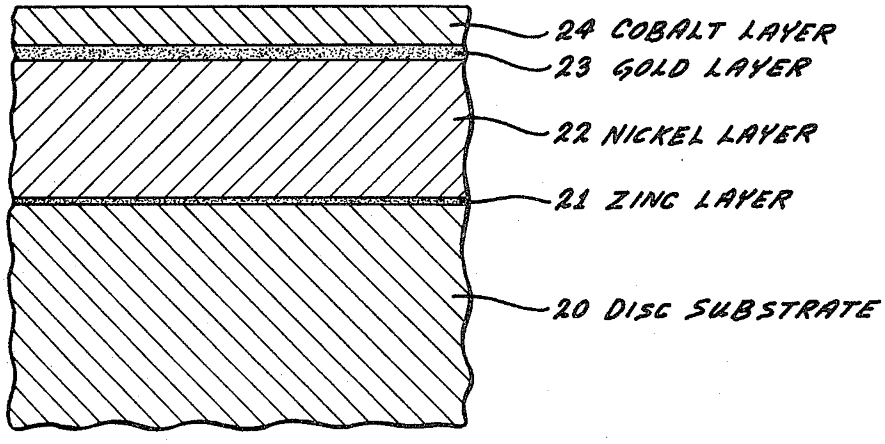
FIG. 1 is a drawing of the improved magnetic recording medium showing the substrate, and thin-film layers deposited thereon.

Referring now to FIG. 1, the preferred embodiment of the magnetic recording medium is shown composed of an aluminum alloy disc substrate 20 which is sufficiently thick (e.g. 0.32 centimeter or 0.128 inch) to provide and maintain uniform flatness of a disc for recording on the recording surfaces by the closely spaced "flying" record heads. The substrate 20 has a circumferential flatness within 4 mils (0.004 inch), a total indicated runout (TIR) per quadrant (radial flatness) of 0.6 mil (0.0006) inch for operation with the flying heads. A typical disc may be approximately 14 inches in diameter and a suitable aluminum alloy for the substrate may contain: zinc 5.1–6.1 percent; magnesium 2.1–2.8 percent; copper 1.2–2.0 percent; and chromium 0.18–0.4 percent. These figures refer to percentages by weight.

Figure 2:
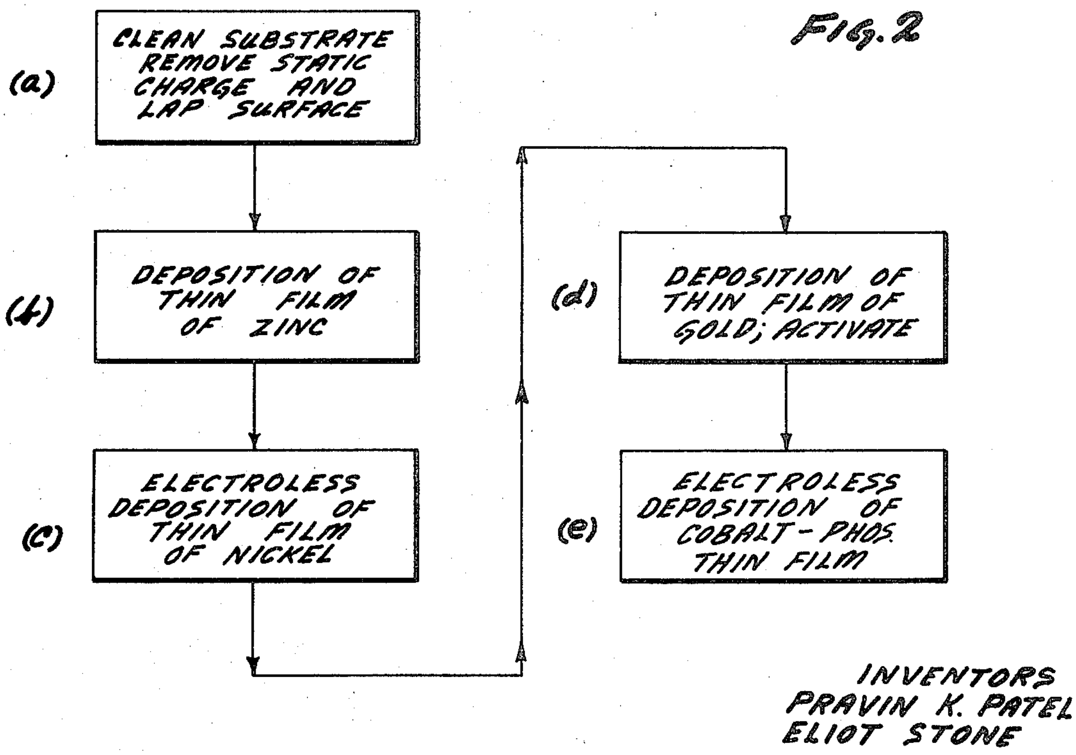
FIG. 2 is a block diagram showing the major process steps involved in producing the magnetic recording medium.

FIG. 2 shows the major process steps involved in the fabrication of the magnetic recording member.

The surfaces of the disc substrate 20 are lapped to provide an extremely smooth or polished surface to eliminate all spikes or other sharp discontinuities and to provide the desired uniform smoothness for operation with the closely spaced flying heads.

The aluminum substrate 20 is first prepared by means of a thorough cleaning providing for vapor de-greasing of the substrate 20 by a solvent for organic materials, the removal of particulate material and elimination of surface electrostatic charge by a non-etching aluminum-cleaning solution followed by a spray rinse of distilled or deionized water. The cleaning further includes immersion in a 1:1 (by volume) solution of nitric acid ($HNO_3$) at room temperature for 15 seconds followed by a spray rinse.

After the thorough cleaning, the disc substrate 20 and the surfaces thereof are prepared further by deposition of a smooth layer of zinc (flashing) 21 by a first immersion in a zincate solution at room temperature (70° F.) for 30 seconds (±10 seconds) followed by a spray rinse and immersion again into the nitric acid solution and another spray rinse. The first zinc film is removed by the nitric acid in order to get an extremely smooth active surface after which a second immersion is made of the disc in the zincate solution, followed by a spray rinse.

After thus preparing the substrate 20 with the zinc flash 21, the entire disc is immersed in a nickel solution (including sodium hypophosphite) for electroless deposition of a non-magnetic nickel-phosphorus thin-film layer 22 having a thickness of 30 to 100 microinches (or in the range of 0.75 to 2.5 microns). The phosphorus content of the layer 22 is in the preferred range of 8% to 15% by weight. This is important as otherwise the layer 22 will exhibit undesired magnetic properties when the disc is heated in subsequent processing. The nickel layer 22 provides a hard base permitting firm adherence of the next layer.

The next step is the provision of a thin-film gold layer 23 over the nickel layer 22. This is effected by electroless or immersion deposition of a layer of at least one-half (0.5) microinch of gold which is then activated by a not less than 0.5 percent glacial acetic acid solution. The deposition of the gold layer is accomplished by immersion of the disc in a gold plating bath of temperature 150–160° F. and pH of 4.5 to 7.5. Suitable gold baths are prepared from commercially available Gold Salt Solutions such as sold by Selrex Corporation and composed of ½ (+½, −0) dry ounce of gold per gallon of water.

After activation of the gold underlayer 23, a thin-film cobalt magnetic recording medium is formed by electroless deposition over the layer of gold by immersion of the disc in a solution containing cobalt chloride, sodium citrate, sodium hypophosphite, ammonium chloride, and sodium lauryl sulfate for 10 to 15 minutes at 80° to 85° C. followed by a spray rinse and forced air dry. Phosphorus, approximately 5 percent by weight, is present with the cobalt in the thin-film so formed to provide the required magnetic recording characteristics including coercivity values of 300 oersteds and higher.

The thickness dimension of the thin-film of cobalt-phosphorus is important because a thin-film must present a continuous surface to provide for a continuous recording along data tracks formed thereon during recording operations. Also, to obtain uniformity in recordings and signal reproduction, the cobalt (Co-P) thin-film must be uniform not only to provide a relatively constant space gap to the flying heads, but also to provide a minimum continuous thickness for reliable magnetic flux density capable of detection by the heads during readout to produce the desired signal amplitudes.

Limitation on the maximum allowed thickness of the cobalt (Co-P) layer is made to obtain the desired resolution of the recorded information since the coercivity decreases and the demagnetization increases with greater thickness of the cobalt magnetic thin-film. Accordingly, the maximum recording density distinguishable (flux reversals per linear inch), decreases with increase of thickness.

Figure 3A:
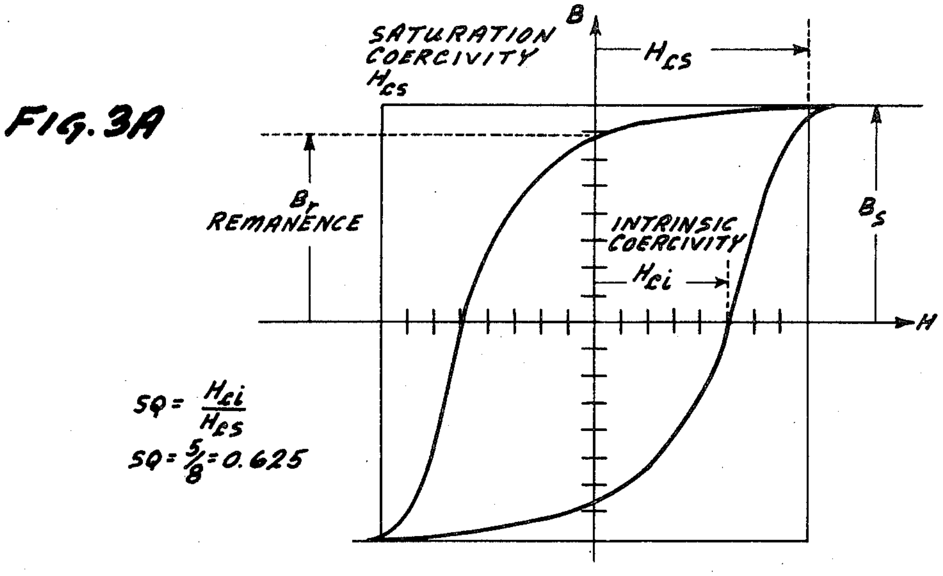
FIGS. 3A and 3B show hysteresis curves for magnetic recording media (which do not have the gold underplate of the present invention) and indicate how the squareness of the hysteresis loop varies with the thickness of the magnetic (cobalt) layer.
Figure 3B:
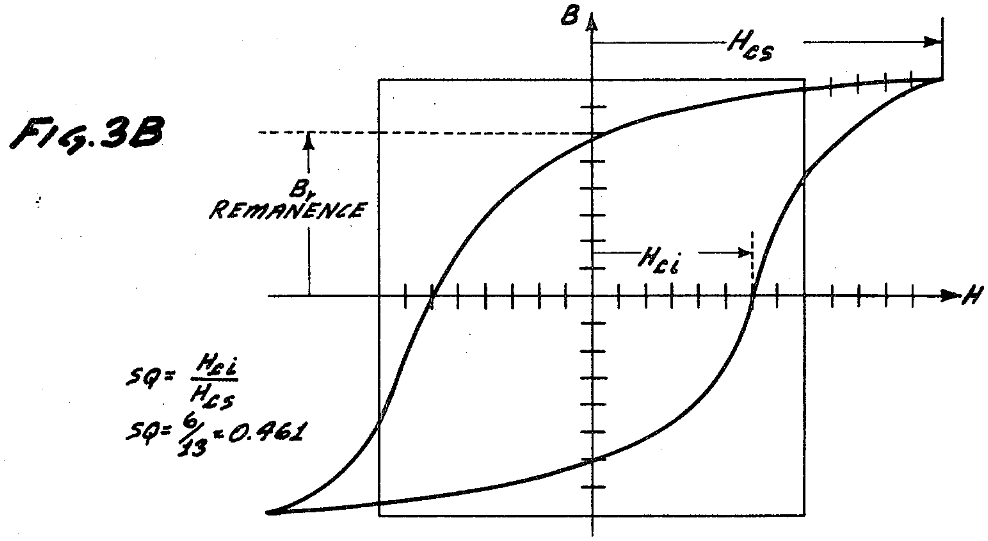

Now referring to FIGS. 3A and 3B, there are shown two B–H hysteresis curves, each applicable to magnetic recording materials of distinctly different deposition thickness. The hysteresis loop shown in FIG. 3A may, for example, represent a cobalt thin-film layer magnetic recording medium having a relatively large thickness of say, from 15 to 20 microinches; while the hysteresis loop shown in FIG. 3B may typically show a cobalt thin-film magnetic recording layer which is relatively thinner, say of the order of 4 to 8 microinches.

Shown on these loops is an indication of the coercivity of the recording medium at saturation, designated $H_{cs}$, and the intrinsic coercivity, designated as $H_{ci}$, which is the point where the loop crosses the H axis and which indicates the amount of externally applied field H which will "flip" or change the field flux B of the magnetic recording medium into the opposite polarity. Also shown in each case is the remanence, $B_r$, which represents the amount of flux field generated in the magnetic medium and remaining in the magnetic medium even though the externally applied field H has been taken away (equal to zero). $B_s$ represents the induced magnetization at saturation.

In regard to most types of recording applications, it is necessary that a high recording density medium be produced and yet be capable of providing a strong output signal during readout, that is to say, it is most desirable that the value of coercivity, $H_{ci}$, approach as closely as possible the value of saturation coercivity, $H_{cs}$. For example, in FIG. 3A, if the value of $H_{ci}$ were equal to 8 units and the value of $H_{cs}$ were 8 units, then the ratio of $H_{ci}$ to $H_{cs}$ would be equal to 1, an ideal condition. The actual example in FIG. 3A shows a ratio of 0.625.

The "squareness" factor, SQ, of the hysteresis loop is an indicator of rapidity of magnetic switching within the magnetic recording medium and the speed with which the magnetic polarity switching in the magnetic medium can be made. The ease and speed with which the recording of one bit of information can be accomplished before starting the recording of the next bit of information is related to loop squareness. The less square the hysteresis loop, the more time is required to bring about the polarization reversals necessary, thus, taking more time for the writing of bits of recorded information. With the taking of more time for this imprintation of informaton, valuable recording time and space is lost resulting in less capability for recording bits per inch and thus a lesser quality of recording density.

With regard to the two different situations presented; where FIG. 3A, indicates a magnetic characteristic of the magnetic recording medium having less coercivity than the situation of FIG. 3B, which represents a thinner coating of cobalt magnetic medium giving a higher coercivity than that of FIG. 3A—it is now possible to observe another factor: that FIG. 3B, while presenting the higher and more desirable figure of greater coercivity is seen to have a worsened "squareness" characteristic. Using the units shown on FIG. 3A and 3B, it is seen that in FIG. 3A, the "squareness characteristic" (ratio of $H_{ci}$ to $H_{cs}$) is ⅝ which is equal to 0.625; while looking at FIG. 3B, it is seen that the squareness ratio is 6 divided by 13, which is equal to 0.461.

So, while the recording medium of FIG. 3B has gained a higher, more desirable coercivity value, this recording medium has lost a considerable amount of "squareness" resulting in deterioration of recording efficiency (longer switching time) and less ability for "bits per inch" of information to be recorded.

The magnetic recording media shown in FIGS. 3A and 3B are not those which are described in the present invention but rather show characteristics of the normal responses of magnetic media in the prior art.

The characteristic providing for capability of usable signal output from information recorded on a magnetic medium is related to "remanence" which may be observed in FIGS. 3A and 3B, and may be called the remanence factor, $B_r$. This remanence factor represents the stored magnetic flux polarity in the magnetic recording medium even through there is no more external driving field ($H=0$). The closer the value $B_r$ is to the value of $B_s$ (the magnetic flux field induced at saturation), the more efficient the magnetic holding power of the magnetic recording medium.

Now comparing the remanence factor, $B_r$, as between FIGS. 3A and 3B, it is observed that the ratio of $B_r$ to $B_s$ in FIG. 3A is higher than that same ratio in FIG. 3B. Thus, the thicker-deposited magnetic film layer in FIG. 3A has a higher efficiency, or better holding power of magnetic flux field than does the thinner-deposited magnetic layer of FIG. 3B (even though FIG. 3B has a higher coercivity).

On this basis it should be obvious that while the higher coercivity of FIG. 3B is most desirable, a price has been paid in terms of the retention efficiency (remanence) and the loop squareness which de termines allowable speed of switching.

The present invention has solved and handled the former problem, the loss of remanence (retentivity) and squareness as a sacrifice to getting higher coercivity.

Figure 4A:
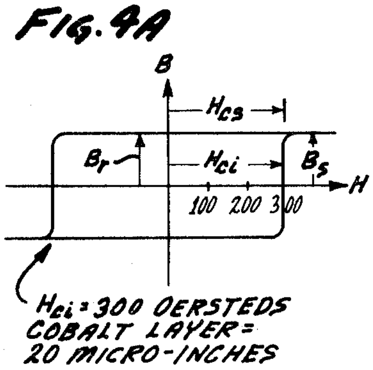
FIG. 4A and FIG. 4B show B-H hysteresis curves for magnetic recording mediums having the gold underplate of the present invention and where FIG. 4A involves a larger plating thickness of cobalt than does FIG. 4B.
Figure 4B:
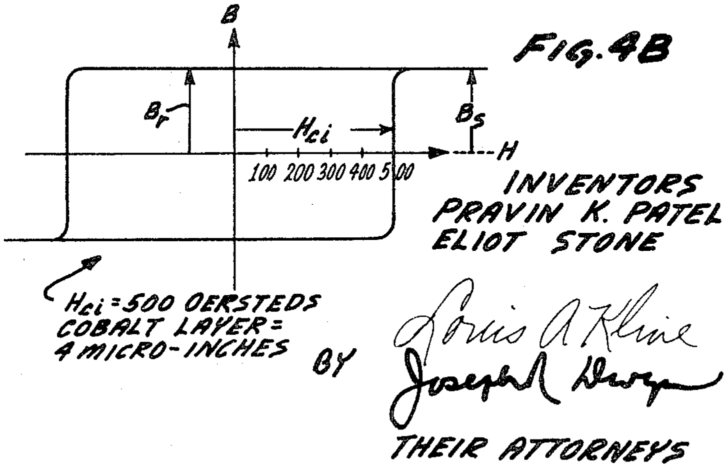

In this respect, the hysteresis loops shown in FIGS. 4A and 4B will illustrate how the loss and deterioration of magnetic characteristics is prevented by the use of a thin-film gold underplating for the cobalt magnetic recording medium.

FIGS. 4A and 4B illustrate an analogous situation to FIG. 3A and FIG. 3B except that in FIGS. 4A and 4B the thin-film cobalt magnetic recording layer is supplied with a gold underplate.

Referring to FIG. 4A we see a hysteresis loop for the magnetic recording medium of the present invention wherein said thin-film cobalt magnetic layer has a thickness of approximately 20 microinches deposited above the gold underplate of ½ microinch. Observing the B-H hysteresis loop, it will be obvious that the squareness factor is equal or approaches the optimum ratio of 1:1, that is to say, the ratio of $H_{ci}$ to that of $H_{cs}$ is approximately one. It may be stated as a figure of merit greater than 0.95. Further, in FIG. 4A the remanence or retentivity factor, $B_r$, as a portion of $B_s$, is also seen to approach one; and may be said to be greater than 0.95.

As an example, in FIG. 4A the coercivity $H_c$ (which is generally considered as equivalent to the intrinsic coercivity $H_{ci}$) may be of a value equal to 300 oersteds, which is the result of the layer of cobalt magnetic film having a thickness of 20 microinches.

Further in FIG. 4B, there is the situation of the magnetic recording medium of the present invention having the gold underplate, but in this case the cobalt thin-film layer is of the order of only 4 microinches which results in this case in a coercivity approaching 500 oersteds.

Again observing FIG. 4B (and in contrast with the changes as between FIGS. 3A to 3B) it is seen that there has been no deterioration in the squareness of the hysteresis loop nor has there been any deterioration in the value of the remanence factor $B_r$ despite the fact that the loop of FIG. 4B provides a coercivity factor, $H_c$, equal to 500 oersteds.

Figure 5:
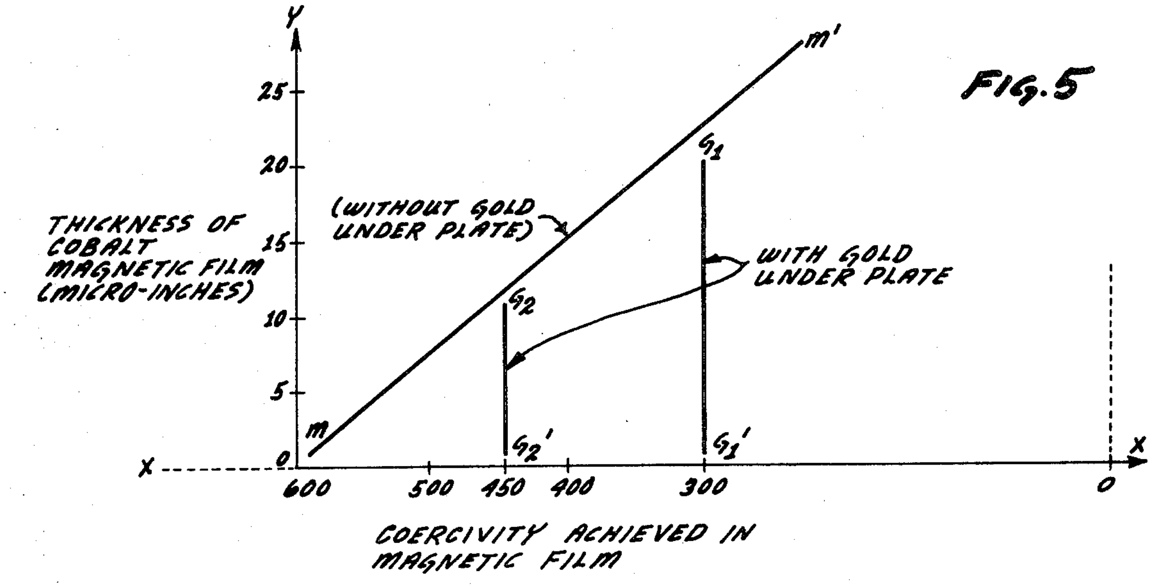
FIG. 5 is a graph which plots the thickness of the cobalt magnetic film and the resultant magnetic coercivity achieved for the conditions of a disc without the gold underplating and for a disc with the gold underplating.

It should be noted here that while FIGS. 4A and 4B show different values of coercivity for two different values of plating thickness of the cobalt layer, the coercivity of the magnetic medium can be made independent of the plating thickness as will be seen in FIG. 5. FIGS. 4A and 4B illustrate the aspect of squareness of the B-H loop achieved with the present invention.

The description regarding FIG. 5 hereinbelow will illustrate how the plating bath conditions may be regulated in order to attain various values of coercivity which are independent of film thickness.

Reference to FIG. 5 will show a plot of coercivity achieved (X axis) in making a magnetic recording medium as against the thickness in microinches of cobalt magnetic film deposited (shown on the Y axis). The curve M–m′ shows the prior art situation of a magnetic recording medium (not having a gold underplate) wherein the coercivity factor, $H_c$, achieved in the magnetic film, was a direct function of the thickness of the film so that at a magnetic film thickness of 20 microinches it was possible to achieve a coercivity of 300 oersteds; and, at a magnetic film thickness of 10 microinches it was possible to achieve a coercivity of 450 oersteds, etc. The curves $G_1$–$G_1'$, and $G_2$–$G_2'$, show the situation of the magnetic recording medium with the gold underplate of the present invention wherein the coercivity, $H_c$, of any given magnetic thin-film is independent of deposited thickness of the cobalt magnetic thin-film layer; and wherein there is no sacrifice of loop squareness (SQ) nor remanence, $B_r$.

At this point it would be of value to indicate how it is possible to achieve the magnetic recording medium of the invention having characteristics representative of the curve $G_1$–$G_1'$ and the curve $G_2$–$G_2'$ of FIG. 5. This is done by modifying the operating conditions of the gold bath and of the cobalt bath as follows:

Example 1.—For example, to achieve the characteristics shown in FIG. 5 by the line $G_1$–$G_1'$ involving an intrinsic coercivity, $H_{ci}$, of the range from 300–350 oersteds, it is required that:

(a) during application of the gold layer by immersion in the gold plating bath, the pH be in the range of 4.5 to 7.5 pH with the gold bath temperature being in the range from 150° to 160° F.; and (b) the step for deposition of the cobalt thin-film layer must be such that the cobalt bath has a pH of 8.70 (±0.2 pH) and the cobalt bath temperature is at the range of 178° F. (±½° F.) Example 2.—regarding the situation of FIG. 5 designated by the line $G_2$–$G_2'$, in order to achieve an intrinsic coercivity $H_{ci}$ of from 400 to 450 oersteds, the following was necessary:

(a) the step for the plating of the gold required a solution pH of from 4.5 to 7.5 pH with the gold bath solution in the temperature range from 150° to 160° F.; and (b) the plating bath for the cobalt plating step of the thin-film layer required a pH of 8.20 (±0.2) and a temperature of 181° F. (±½° F.).

Figure 6:
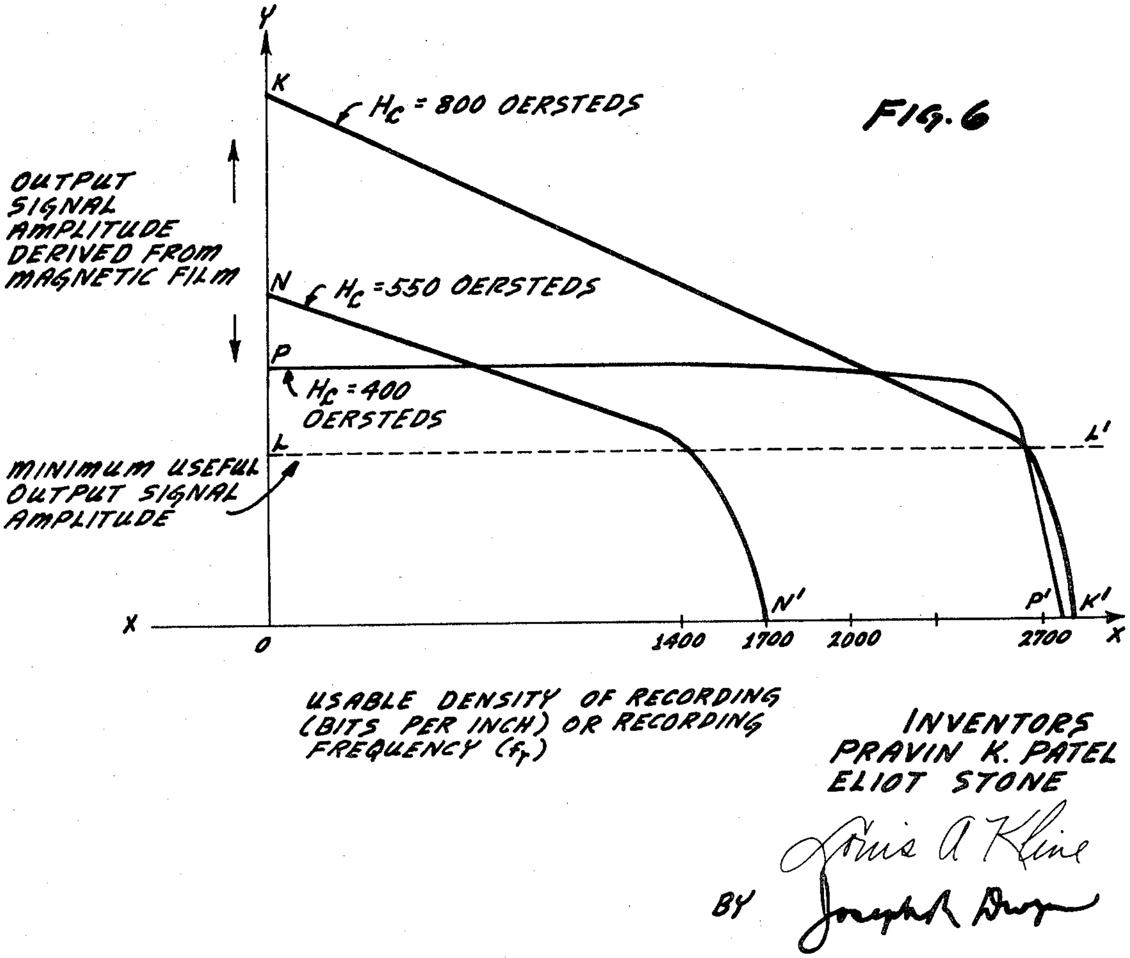
FIG. 6 is a graph of magnetic recording frequency plotted against coercivity of a number of different types of magnetic cobalt films showing how the coercivity, $H_c$, of the films of various magnetic recording media vary in signal output with recording frequency.

A revealing comparison of prior magnetic recording media with those of the present invention may be seen by the plotted graphs of FIG. 6. In FIG. 6 the X-axis is a measure of the usable density of recording in bits per inch. Or stated in another way, the X-axis is the recording frequency capability of the given magnetic recording medium, recording frequency being designated by $f_r$ The Y axis would be, in FIG. 6, the measure of the output signal amplitude which might be derived from any given magnetic film, and the line L–L' would represent the minimum useful output signal amplitude allowable for feasibility.

First, taking a look at magnetic recording media of the prior art by observing a typical curve N–N', it is seen that, with a basic coercivity of 550 oersteds, the output signal from this recording medium takes a steady drop and at 1400 bits per inch drops below the usable output amplitude, thence drops to zero (0) at 1700 bits per inch.

Another form of magnetic recording medium of the prior art is shown by the graph K–K'. In this case the coercivity is 800 oersteds and it is seen that the output signal from this magnetic medium drops rather constantly, dropping below a usable amplitude at 2700 bits per inch.

The magnetic recording medium of the instant application is represented on the curve P–P' and shows that even though the coercivity is 400 oersteds, the output signal amplitude maintains an almost constant amplitude throughout the range of recording frequency up to about 2700 bits per inch.

Thus, using only electroless depositions, which offer significant economic advantages over electrolytic depositions, it is possible to produce a magnetic recording surface with high coercivity combined with much squarer B-H loop characteristics than was heretofore possible by known electroless deposition techniques.

Fabrication method

Many of the steps involved in the fabrication of magnetic media such as magnetic discs are well known in the prior art. These steps will only be mentioned in passing, with the exception of those steps involving features critical to the present invention.

Basically, the aluminum alloy substrate is cleaned and polished after which a thin-film of zinc is deposited by electroless deposition; then electroless deposition is used to place a thin-film of nickel over the zinc layer after which electroless deposition is used to deposit the thin-film of gold over the nickel layer such that the gold plating bath has a pH in the range of 4.5 to 7.5 with a bath temperature from 150° to 160° F.; the final step for plating the magnetic film of cobalt phosphorus is done by electroless deposition with a cobalt bath chosen to have (i) a pH of 8.70 (±0.2) at a temperature of 178 (±0.5) ° F., or (ii) a pH of 8.20 (±0.2) at a temperature of 181 (±0.5) ° F.

The above step (i) provides for an intrinsic coercivity of 300 oersteds; while the step (ii) provides for a coercivity of 450 oersteds.

Thus a structure and a process for producing a magnetic media has been described which uses only electroless depositions, is economical and easily reproducible to provide high coercivity square loop magnetic properties and is capable of being arranged so that the coercivity of the cobalt layer is independent of film thickness and said value of coercivity can be tailored according to specific bath plating conditions.

What is claimed is:

1. A magnetic memory device comprising:
a substrate of non-magnetic material;
said substrate being coated by a thin-film layer of zinc;
said zinc layer being coated by an adherent layer of electrolessly deposited nickel;
said nickel layer being coated by an adherent layer of electrolessly deposited gold; and
said gold layer being coated by an adherent layer of electrolessly deposited cobalt-phosphorus.

2. The device of claim 1 wherein said cobalt-phosphorus layer has a thickness in the range of 4 to 20 microinches.

3. The device of claim 2 wherein each of said zinc, nickel and gold layers has a deposited thickness no greater than 150 microinches.

4. In a magnetic recording medium having a coercivity not less than 300 oersteds and a square loop characteristic no less than 0.95, the combination comprising in the order stated:
a disc substrate having a precisionally flat surface;
a thin-film layer of zinc having a thickness of at least one-half microinch;
a thin-film layer of electrolessly deposited nickel at least 30 microinches in thickness;
a thin-film layer of electrolessly deposited gold at least 0.5 microinch in thickness;
a thin-film, electrolessly deposited cobalt magnetic layer at least 4 microinches thick and not thicker than 20 microinches.

5. In a magnetic recording medium having uniform flux retention over a wide range of recording frequencies and providing an intrinsic coercivity, $H_{ci}$, of no less than 300 oersteds, the combination comprising in the order stated:
a base substrate;
a thin-film layer of zinc;
a thin-film layer of nickel;
a thin-film layer of gold;
and a thin-film layer of cobalt-phosphorus.

6. The magnetic recording medium of claim 5 wherein the hysteresis loop characteristic maintains a ratio of 0.95 or greater for the rates of intrinsic coercivity ($H_{ci}$) to the saturation coercivity ($H_{cs}$).

7. The magnetic recording medium of claim 5 wherein said gold layer is not less than 0.5 microinch in thickness.

8. A layered magnetic device which includes a magnetic film of thickness no greater than 20 microinches;
said device having an intrinsic coercivity greater than 300 oersteds and a hysteresis loop squareness ratio greater than 0.95, comprising:
a base substrate;
a plurality of discrete thin-film layers electrolessly deposited thereon;
the outermost of said deposited layers including a magnetic material having uniform thickness, said magnetic material being electrolessly deposited from a solution of cobalt, sodium hypophosphite, sodium citrate, and amonium chloride;
the other layers being formed of zinc, nickel, and gold starting from the base substrate outwardly in the order stated to said magnetic layer;
and each of said non-magnetic layers having a uniform thickness no greater than 200 microinches.

9. In an article which includes a thin magnetic film, the combination comprising in the order stated:
a rigid, uniformly smooth base substrate selected from the group of metals of aluminum, aluminum alloy, copper or other similar non-magnetic materials;
a thin-film layer of zinc having a thickness of at least one-half microinch;
a thin-film layer of nickel at least 30 microinches in thickness;

a thin-film layer of gold at least 0.5 microinch in thickness;

said substrate, zinc layer, nickel layer, and gold layer, providing an underlying base for said thin-film magnetic layer; and said thin magnetic film having an intrinsic coercivity not less than 300 oersteds and having a ratio of intrinsic coercivity, $H_{ci}$, to saturation coercivity, $H_{cs}$, which is at least 0.95.

10. The article of claim 9 wherein said magnetic thin-film has a thickness in the range of from 4 to 20 microinches and contains cobalt-phosphorus.

References Cited

UNITED STATES PATENTS

| | | | |
|---|---|---|---|
| 3,180,715 | 4/1965 | Simon | 29—194 |
| 3,466,156 | 9/1969 | Peters et al. | 29—195 |

L. DEWAYNE RUTLEDGE, Primary Examiner

E. L. WEISE, Assistant Examiner

U.S. Cl. X.R.

29—197, 199